July 28, 1931.  G. L. HISE  1,816,327
CONVEYER
Filed April 19, 1929
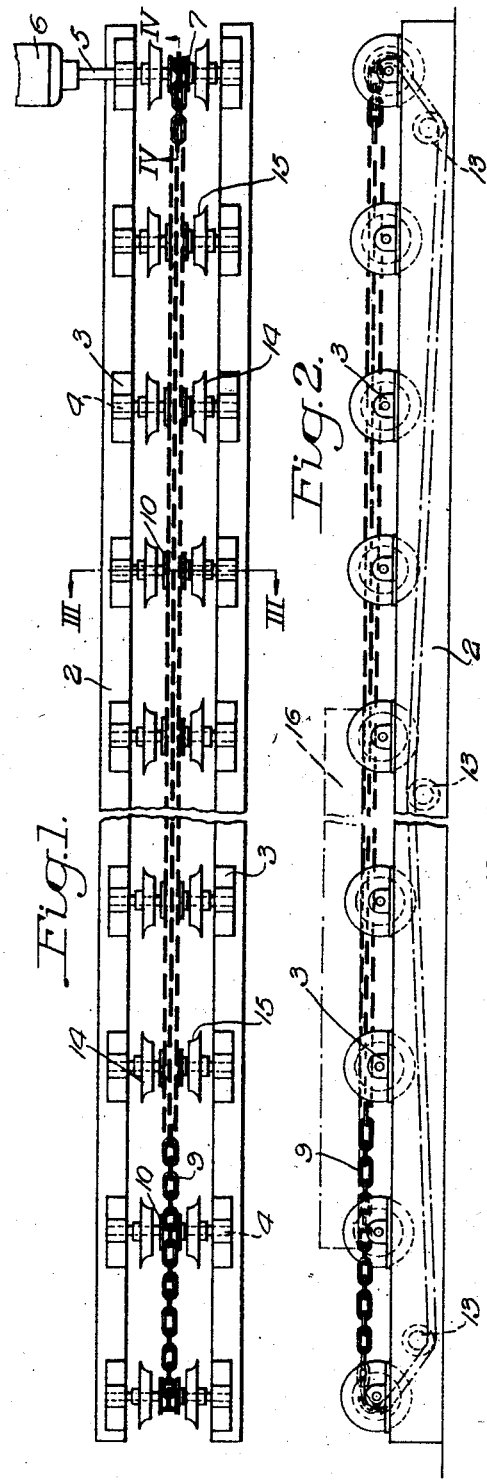
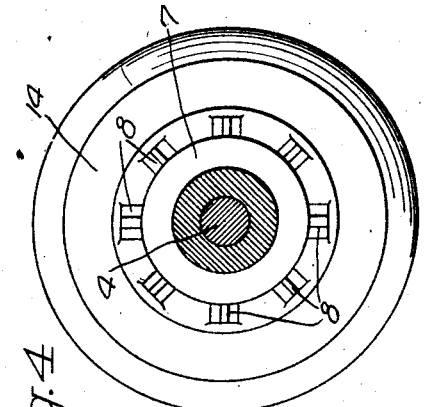
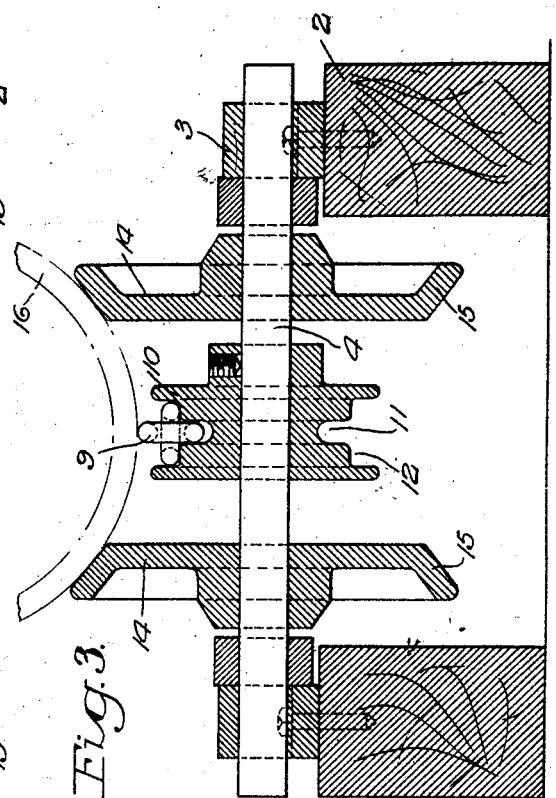
INVENTOR
George L. Hise
by Byrnes, Stebbins & Parmelee
his attorneys Patented July 28, 1931

1,816,327

UNITED STATES PATENT OFFICE

GEORGE L. HISE, OF AMBRIDGE, PENNSYLVANIA

CONVEYER

Application filed April 19, 1929. Serial No. 356,328.

This invention relates to conveyers and more particularly to conveyers for conveying solid articles of generally elongated shape, such, for example, as sections of pipe. The invention is particularly useful in conveying pipe sections in a pipe mill and will be particularly described as applied to the conveying of pipe, although it is adapted for many other uses.

In a pipe mill it is necessary, especially as the pipe is being completed and delivered, to provide a simple, inexpensive, and efficient conveyer for transporting the pipe from one part of the mill to another. This transporting has heretofore been carried out by conveyers of various kinds, by hand labor, and by overhead cranes. However, all of such conveying methods as heretofore used have entailed considerably more expense and labor than is warranted for the operation.

I provide a conveyer adapted for rapidly and cheaply conveying elongated articles, such as pipe sections, which can be quickly installed, adjusted, and removed, and which requires little attention. I provide an endless conveying element whose breadth is not substantially greater than its thickness, which is adapted upon axial movement to carry with it elongated articles which lie over the conveying element and are maintained in supporting relation therewith. In its simplest form the conveyer comprises an endless chain which is driven from a sprocket at one end, the chain riding over guiding sheaves to keep it in proper alignment and to support it in conveying position. Means are provided for preventing the articles being conveyed from rolling or slipping off of the conveying element so that axial movement thereof effects a continuous forward movement of the articles. Other objects and advantages of the invention will become apparent as the following description of a present preferred embodiment thereof proceeds.

In the accompanying drawings I have shown a present preferred embodiment of the invention wherein, Figure 1 is a plan view of a conveyer, Figure 2 is an elevation of the conveyer shown in Fig. 1, Figure 3 is a cross-section taken on the line III—III of Fig. 1, and Figure 4 is a cross-section taken on the line IV—IV of Fig. 1.

Referring more particularly to the drawings, there is provided a frame or base 2, on which are mounted at intervals bearings 3 carrying stub-shafts 4. The shaft 4 at one end of the base is extended as shown at 5 to a driving motor 6. This shaft has keyed to it a driving sprocket 7 having teeth 8 adapted to engage and drive a conveying chain 9.

The remaining shafts 4 have fixedly mounted upon them guiding and supporting sheaves 10 which are formed with a deep annular recess 11 and a shallower but wider annular recess 12, the former to receive the links of the chain endwise and the latter to receive such links crosswise as shown in Fig. 3. The sheaves 10 support the conveying chain 9 and maintain it in proper position, at the same time preventing it from twisting. The chain moves in one direction over the sheaves 10 and is returned beneath the sheaves 10 where it is guided by sheaves 13.

Loosely or floatingly mounted on the respective shafts 4 and on opposite sides of the respective sheaves 10 are guiding discs 14. These discs are free to move axially of the shafts 4 and also to rotate with respect to such shafts. The guiding discs 14 have beveled faces 15 for the purpose of guiding articles to be conveyed to maintain such articles in supporting relationship with respect to the chain 9. A portion of a pipe section is shown diagrammatically in dot-and-dash lines at 16, such pipe section resting upon the chain 9 and being maintained in contact with the chain by means of the guiding discs 14. The discs, by reason of being floatingly mounted on their respective shafts, are enabled to adjust themselves to articles such as pipe sections of various sizes. They form an effective means for keeping such articles from rolling or sliding out of contact with the conveying chain.

I am aware that endless conveyers of many kinds have heretofore been used for conveying articles such as pipe sections. However, so far as I know, no conveyer has heretofore been proposed which is constructed in the new and useful manner above described and is adapted for operation at low cost and with high efficiency. The use of a flexible conveying element such as a chain reduces very greatly the weight of the conveying element which must be moved by the driving means and further reduces to a minimum the space consumed by the conveyer. There is no need for providing any special means for engaging the articles to be conveyed, such as projections or hooks, although the conveyer might conceivably be used for some purposes wherein the provision of such means would be advisable.

While I have shown and described a present preferred embodiment of the invention, it is to be distinctly understood that the same is not limited thereto but may be otherwise variously embodied within the scope of the following claims.

I claim:

1. A conveyer for elongated articles, comprising an endless link chain, a sprocket for driving the chain, guiding and supporting sheaves for the chain disposed at intervals therealong, the articles to be conveyed being adapted to lie over and in contact with the chain and being adapted to be impelled forwardly by frictional engagement with the chain, and means for guiding the articles in said cooperative relationship with the chain.

2. A conveyer for elongated articles, comprising a single endless carrying member whose breadth is not substantially greater than its thickness, means for driving the carrying member, means connected with the conveyer and having portions bearing laterally against the carrying member at points throughout its length to hold the same against lateral displacement in a generally horizontal plane, and means for guiding articles to be conveyed so as to lie over and in contact with the carrying member and be carried along by frictional engagement therewith.

3. A conveyer for elongated articles, comprising an endless flexible chain, driving means therefor, guiding means therefor connected with the conveyer and having portions bearing laterally against the chain at points throughout its length to hold the same against lateral displacement in a generally horizontal plane, and means for maintaining articles being conveyed in contact with the chain itself so that they are carried along by frictional engagement therewith.

4. A conveyer for elongated articles, comprising an endless chain, driving means therefor, and floating guiding members on opposite sides of the chain and mounted independently of the chain for maintaining articles being conveyed in contact with the chain.

5. A conveyer for elongated articles, comprising an endless chain, driving means therefor, shafts extending transversely and mounted independently of the chain, and floating guiding discs on the shafts on opposite sides of the chain.

6. A conveyer for elongated articles, comprising an endless chain, driving means therefor, shafts extending transversely and mounted independently of the chain, guiding sheaves for the chain on the shafts, and floating guiding discs on the shafts on opposite sides of the sheaves.

7. A conveyer for elongated articles, comprising an endless chain, means for driving the chain, guiding and supporting means connected with the conveyer and having portions bearing laterally against the chain at points throughout its length to hold the same against lateral displacement in a generally horizontal plane, the articles to be conveyed being adapted to lie over and in contact with the chain and being adapted to be impelled forwardly by frictional engagement with the chain, and means for guiding the articles in said cooperative relationship with the chain.

In testimony whereof I have hereunto set my hand.

GEORGE L. HISE.